United States Patent Office 3,480,566
Patented Nov. 25, 1969

3,480,566
LOW MELTING GLASS AND COMPOSITIONS CONTAINING THE SAME
Lewis C. Hoffman, Wilmington, Del., assignor to E. I. du Pont de Nemours and Company, Wilmington, Del., a corporation of Delaware
No Drawing. Filed Oct. 22, 1965, Ser. No. 502,486
Int. Cl. H01b $1/00$; C03c $3/30$
U.S. Cl. 252—514  4 Claims

ABSTRACT OF THE DISCLOSURE

This invention relates to vitreous compositions comprising small but substantial amounts of certain metal oxides which impart unexpected and beneficial high wetting and low temperature softening characteristics to the vitreous composition in which they are included. More especially, the invention relates to the inclusion of either $WO_3$ or $V_2O_5$ into glasses containing $Bi_2O_3$, PbO, and at least one of the two oxides $B_2O_3$ and $SiO_2$. The invention, in addition, is directed to overglazing and metallizing compositions which include the novel vitreous compositions referred to above.

---

$PbO$-$Bi_2O_3$-$B_2O_3$-$SiO_2$ glasses, to which this invention in part relates, are well-known silver binders. Knox, U.S. Patent 2,385,580, for example, describes their use in conjunction with silver as metalizing compositions in the manufacture of electrical devices. The glasses disclosed by Knox have melting points of about 650° C. and generally wet ceramic substrates poorly with a high contact angle of about 25° to 30°. There is no mention in Knox or other known prior art of the inclusion of $WO_3$ and/or $V_2O_5$ in vitreous compositions employed in the making of electrical components. Beck and Taylor in U.S. Patent 2,853,393 disclose the use of $WO_3$ as an additive in $PbO$-$B_2O_3$-$P_2O_5$ glasses. The $WO_3$ was disclosed in this patent as used in relatively large percentages to provide high refractive index gem-like glass compositions. No mention was made of the melting point or wetting qualities of these glasses. Brekhovskikh has disclosed in Glastech Ber. 32, 437–42 (1959) that $V_2O_5$ has been added to $PbO$-$Bi_2O_3$-$SiO_2$ glass and $Bi_2O_3$-$B_2O_3$-$SiO_2$-$P_2O_5$ and -$GeO_2$ glasses with the resulting formation of nonglass compositions.

It is an object of this invention to provide novel glasses with excellent wetting and softening properties which can be used with great advantage in the manufacture of electrical circuits and circuit components. It is a further object of this invention to provide overglazing and metallizing compositions comprising these glasses which can be used in the manufacture of electrical circuits and components thereof. Still other objects of the invention will be obvious to those skilled in the art reading the following detailed description of the invention.

All of the objects of this invention are achieved through the use of vitreous compositions consisting essentially of 15 to 75 weight percent of $Bi_2O_3$, 6 to 82 weight percent of PbO, 0 to 7 weight percent of $B_2O_3$ and 0 to 10 weight percent of $SiO_2$, the sum of the $SiO_2$ and $B_2O_3$ present being within the range of 1 to 15 weight percent and either 1 to 10 weight percent of $WO_3$ or 1 to 5 weight percent of $V_2O_5$. The overglazing compositions of this invention comprise the above vitreous compositions and liquid vehicles wherein the amount of vehicle preferably does not exceed 60 percent by weight of the overglazing compositions. The metallizing compositions comprise finely divided powder of the above vitreous compositions in the weight percent range of from 7.5 to 30 percent, powders of finely divided noble metal particles in the weight percent range of from 30 to 75 percent and a liquid vehicle in the weight percent range of from 15 to 40 percent.

The novel vitreous compositions of this invention are made by mixing or adding together known batch constituents and heating the batches to form the glasses. In preparing the batches from which the glasses of this invention are formed, $Bi_2O_3$ can be added as such, PbO as litharge or red lead, $B_2O_3$ as boric acid and $SiO_2$ as glass sand or potter's flint. $WO_3$ can be added as tungstic acid anhydride and $V_2O_5$ can be added as ammonium vanadate or vanadium pentoxide. In each case the amounts of batch constituents are adjusted to yield the amounts of oxides required by the weight percent composition of the glass desired.

The glass compositions of this invention were prepared by melting 50 gram batches to homogeneity in kyanite crucibles at 1200° C. and pouring out 2 cm. diameter discs onto steel plates. All the discs cooled without opacifying, were homogeneous and single phase. The compositions were accordingly regarded as glass forming. The compositions were then tested to determine the value of various physical characteristics related to their use as overglazing and metallizing compositions.

Densities were measured by the method of Archimedes, using glass fragments. The fragments were weighed, then placed in water to displace an equal volume thereof.

Thermal expansions and softening points were measured in a fused silica apparatus consisting of a piston inside a cylinder resting on a three inch by ½ inch diameter bar of the glass. The extension of the silica rod was transmitted to an axis of an $x$–$y$ recorder by means of a variable transformer. Temperature was fed to the other axis of the recorder by means of a thermocouple. The thermal expansion was calculated from the average slope of the curve in the range of 0–200° C., extrapolated where necessary. The softening point was taken as that temperature at which the $x$–$y$ recorder trace showed a reversal of slope.

The contact angles were measured on alumina plates heated by means of platinum strip resistor to 750° C. Temperature was measured by an optical pyrometer and the contact angle by an optical magnifying apparatus fitted with a calibrated eyepiece. The angle measured was "advancing" in all cases. The alumina plates employed were the commercially available "AlSiMag" 614, manufactured by American Lava Co., Chattanooga, Tennessee. Other substrates, including those composed of forsterite, sapphire, steatite, titanium dioxide, alkali earth titanates or zircon porcelain, showed improved wetting with the compositions of this invention, similarly as did the alumina substrate.

Table I, set forth herebelow, identifies novel compositions of this invention by weight percent of their ingredients and lists together therewith data obtained as above indicated on density, thermal expansion, softening point and contact angle measured at 750° C. All of the examples set forth have utility in overglazing and metallizing compositions. The table also sets forth the ranges of ingredients usable in the practice of the invention.

TABLE I.—COMPOSITIONS, WT. PERCENT

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| $Bi_2O_3$ | 75.5 | 54.5 | 15.0 | 15.0 | 15.0 | 33.0 | 33.0 | 33.0 | 47.0 | 44.0 | 47.0 |
| PbO | 6.5 | 42.0 | 81.5 | 80.5 | 72.5 | 64.0 | 62.0 | 60.0 | 47.0 | 47.0 | 45.0 |
| $B_2O_3$ | 6.5 | 1.25 | 1.25 | 1.25 | 1.25 | 2.0 | 2.0 | 2.0 | 4.0 | 4.0 | 4.0 |
| $SiO_2$ | 6.5 | 1.25 | 1.25 | 1.25 | 1.25 | | | | | | 2.0 |
| $WO_3$ | 5.0 | 1.0 | 1.0 | 2.0 | 10.0 | 1.0 | 3.0 | 5.0 | 2.0 | 5.0 | |
| $V_2O_5$ | | | | | | | | | | | |
| Dens., gr./cc | 6.782 | 6.914 | 7.321 | 7.217 | 6.923 | 6.945 | 7.143 | 7.210 | 7.938 | 7.692 | 7.803 |
| Thermal exp., p.p.m./°C | 12.6 | 13.4 | 12.8 | 13.1 | 13.2 | 11.5 | 12.7 | 14.6 | 15.2 | 14.4 | 16.1 |
| Soft. pt., °C | 252 | 270 | 280 | 285 | 315 | 255 | 280 | 285 | 265 | 275 | 255 |
| Cont. angle at 750° C. degrees | 21 | 16 | 4 | 3 | 12 | 15 | 18 | 20 | 9 | 9 | 12 |

| | Examples | | | | | | | | | | |
|---|---|---|---|---|---|---|---|---|---|---|---|
| | 12 | 13 | 14 | 15 | 16 | 17 | 18 | 19 | 20 | 21 | 22 |
| $Bi_2O_3$ | 33.0 | 33.0 | 33.0 | 33.0 | 73.0 | 32.0 | 32.0 | 32.0 | 32.0 | 63.0 | 68.0 |
| PbO | 61.0 | 58.0 | 61.0 | 58.0 | 20.0 | 59.0 | 61.0 | 60.0 | 58.0 | 20.0 | 20.0 |
| $B_2O_3$ | 4.0 | 4.0 | 4.0 | 4.0 | 5.0 | 4.0 | 4.0 | 4.0 | 4.0 | 5.0 | |
| $SiO_2$ | | | | | | | | | | 10.0 | 10.0 |
| $WO_3$ | 2.0 | 5.0 | | | 2.0 | 5.0 | 3.0 | 4.0 | 6.0 | 2.0 | 2.0 |
| $V_2O_5$ | | | 2.0 | 5.0 | | | | | | | |
| Dens., gr./cc | 7.599 | 7.797 | 7.408 | 7.354 | 7.909 | 7.114 | 7.259 | 7.364 | 8.493 | 6.917 | 7.325 |
| Thermal exp., p.p.m./°C | 15.2 | 13.6 | 13.9 | 13.7 | 14.6 | 15.1 | 13.8 | 13.8 | 12.6 | 14.1 | 14.2 |
| Soft. pt., °C | 260 | 252 | 245 | 255 | 270 | 310 | 300 | 300 | 310 | 320 | 340 |
| Cont. angle at 750° C. degrees | 14 | 12 | 15 | 11 | 15 | 18 | 20 | 23 | 17 | 20 | 22 |

| | Examples | | | | | | All compositions, range | Compositions containing $V_2O_5$, range | Compositions containing $WO_3$, range |
|---|---|---|---|---|---|---|---|---|---|
| | 23 | 24 | 25 | 26 | 27 | 28 | | | |
| $Bi_2O_3$ | 49.0 | 49.0 | 32.0 | 73.0 | 32.0 | 32.0 | 15–75 | 15–75 | 15–75 |
| PbO | 45.0 | 45.0 | 64.0 | 20.0 | 59.0 | 61.0 | 6–82 | 6–82 | 6–82 |
| $B_2O_3$ | 2.0 | | | | | | 0–7 } 1–15 | 0–7 } 1–15 | 0–7 } 1–15 |
| $SiO_2$ | 2.0 | 4.0 | 2.0 | 5.0 | 4.0 | 4.0 | 0–10 } | 0–10 } | 0–10 } |
| $WO_3$ | | | | 2.0 | 5.0 | 3.0 | 0–10 | | 1–10 |
| $V_2O_5$ | 2.0 | 2.0 | 2.0 | | | | 0–5 | 0–5 | |
| Dens., gr./cc | 7.842 | 7.535 | 7.243 | 6.943 | 7.439 | 6.940 | 6.782–8.493 | | |
| Thermal exp., p.p.m./°C | 14.7 | 14.2 | 15.0 | 11.8 | 14.2 | 15.1 | 11.5–16.1 | | |
| Soft. pt., °C | 275 | 280 | 260 | 265 | 255 | 270 | 242–340 | | |
| Cont. angle at 750° C. degrees | 8 | 11 | 15 | 18 | 12 | 11 | 3–22 | | |

The compositions in which PbO and $Bi_2O_3$ are present in about the same amounts, e.g., Nos. 9, 10 and 11, are preferred for their combination of stability as glasses, low softening points and good wetting qualities. Compositions high in PbO show the next most attractive combination of properties and those high in $Bi_2O_3$ are last in order of preference. One of the major contributions of $WO_3$ and $V_2O_5$ is their ability to increase the wetting of ceramic substrates at a given temperature.

The beneficial effect of $V_2O_5$ and $WO_3$ is thought to come about from the high ratio (at least 2.5 to 1) of oxygen ions to cations in these oxides. While there are other metals in the periodic table which form oxides with high anion to cation ratios, none other than vanadium or tungsten are now known to applicant which offer a combination of high oxygen ion to cation ratio and which are weak and will not contribute to the forces holding the glass together. The weak forces of $V^{5+}$ and $W^{6+}$ are due to their large sizes. $P^{5+}$ is an example of a cation which forms an oxide with a high ratio of anions to cations, but the small size of the $P^{5+}$ ion yields a very high force field which adds to the cohesive force of the molten substance. Highly coherent liquids of high viscosity are less likely to wet substrates than are liquids which are weakly coherent.

The compositions set forth in Table I are useful as overglazing glasses in the encapsulating of hybrid circuits and in the formation of dielectrics in printed capacitors. As previously indicated, they may also be used as binders in metalizing compositions. To be used in these manners, the glasses are most usually prepared as frits so that they may be readily comminuted to small particles, dispersed in inert vehicles and applied as enamels. The glass batch components, as indicated above, are melted to homogeneity in kyanite, alumina or platinum crucibles and then fritted by being poured into water. The frits are recovered from the water and ball milled in normal fashion until their average particle sizes are about 10 microns. The frits are then filtered from the mill water, dried and combined with the proper vehicles.

As a vehicle, any inert liquid may be employed. Preferably an organic solvent is used, with or without thickening agents, stabilizing agents or the like. Examples of such solvents are methyl, ethyl, butyl, propyl and higher alcohols, the corresponding esters of these alcohols such as the acetates, propionates, etc., the terpenes, and liquid resins such as pine oil, alpha-terpineol and beta-terpineol. Other liquids almost without limit may be used; the function of the liquid is mainly to form a paste or liquid of the desired viscosity for application purposes. The vehicles may, in addition to the above ingredients, contain or be composed of volatile liquids which promote fast setting after application.

As thickening agents, ethylcellulose and methyl and butyl methacrylate resins may be employed. Solutions of from 1–10 percent by weight of ethylcellulose in beta terpineol are preferred and have been used in the following examples.

The glasses of this invention together with appropriate vehicles are applied by any desired method to ceramic substrates, with or without circuit components, such as capacitor conductors and resistors printed thereon. The methods commonly used are dipping, banding, spraying and screen-stenciling. The glasses may be employed in molten form as the sole ingredients of dipping compositions. The glasses in frit form may be dispersed in vehicles such as 2 percent solutions of ethylcellulose in beta terpineol to provide dipping slurries. Dipping slurries comprising glass frits and vehicle generally contain about 50% inorganic solids. Banding or rotating wheel applicator vehicles are slightly more viscous than the fluid dipping variety and an example thereof is a 4% by weight solution of ethylcellulose in beta terpineol. Spraying vehicles are generally based on aqueous solutions of 2% by weight methylcellulose. Organic solvent spray vehicles are rare. Screen-stencil vehicles are the most viscous of all. An 8% by weight solution of ethylcellulose in beta terpineol is a good example of a screen-stencil vehicle. In all instances, the amount of vehicle used is sufficient to enable the glass composition to be readily and properly applied; excessive amounts of vehicle require longer drying periods and are an unnecessary expense.

Several examples of the use of the glasses of this invention in overglazing compositions, including compositions used for capacitor dielectrics formation, are set forth herebelow.

EXAMPLE 29

Application by dipping into the melt

Frits prepared as described above from compositions 2–5 were found to be particularly suited for application by the melt dip method. The frits of these four examples were separately melted at a relatively high temperature, ca. 1000°, and then lowered rapidly to a temperature about 100° C. above their softening points. Their temperatures were then adjusted until their viscosities were such that parts thereof did not form "strings" on removal from the molten bath. Fired printed circuit elements containing Pd-PdO-Ag-lead borosilicate resistors and Pt-Au conductors forming a "resistive capacitance network" on alkaline earth titanate ceramic substrates were preheated to about 150° C. to minimize thermal shock and were then rapidly dipped into the molten glasses, held there for 1–5 seconds and removed and allowed to cool. Thin layers of glass remained on the circuit elements and solidified on cooling to provide excellent gas-tight, hermetic coatings.

EXAMPLE 30

Application by dipping

Frits prepared from compositions 6–10 were separately ball milled, dried and dispersed in 2% solution of ethylcellulose in beta terpineol to provide 50% frit solids slurries. Chip active devices, silicon diodes, were dipped into the slurries, removed, allowed to drain and then fired at 350° C. for 1–2 minutes. This short time-temperature exposure did not adversely affect the active device parameters and provided an inexpensive, durable, gas-tight coating.

EXAMPLE 31

Application by banding

Spiraled, end capped rod resistors were banded so that only the resistor portions which consisted of Pd-PdO-Ag-lead borosilicate glass were covered with slurry when the resistors were contacted with the upper portion of a slowly rotating aluminum disc whose lower portion moved through a banding slurry. Ten banding slurries, each comprised of an 80% dispersion of the frit of one of the compositions 11–20 and a 4% ethylcellulose-beta terpineol solution were used to coat different resistors. After drying, the coated resistors were fired at 400° C. for 2–3 minutes. The resistance values of these resistors changed less than the acceptable 1% during the overglazing application and firing. The coatings formed were gas tight and durable.

EXAMPLE 32

Application by screen-stenciling

Frits of compositions 21 and 22 are particularly suited for screen-stenciling over Pd-PdO-Ag-lead borosilicate glass resistors on flat substrate microcircuits. Separate slurries of these compositions were prepared, each containing an 80% dispersion of the frit of one of the compositions in an 8% ethylcellulose-beta terpineol solution. These slurries were applied through a screen-stencil so as to cover only the resistors. Firing at 450° C. for 2–3 minutes gave less than ½% change in electrical resistance and produced moisture-proof, gas-proof coatings. Unprotected resistors exhibited large changes in the electrical resistance when tested separately in high humidity and hydrogen atmospheres. The resistors coated in accordance with this example showed no significant resistance change when similarly tested.

EXAMPLE 33

Application by screen-stenciling

Frit of composition 1 is a particularly suitable dielectric material. Printed capacitors were formed by stenciling a platinum-gold metal electrode on a flat alumina substrate, overstenciling with a screen-stencil composition of 80% frit of composition 1 and 8% ethylcellulose in beta terpineol, then overstenciling a second electrode of platinum-gold composition. In the assembly of some of the capacitors, each layer was fired separately; in other instances, all three layers were brought to maturity at once by simultaneous firing at temperatures from 450–750° C. and times of 1.5 to 10 minutes. Ten thousand picofarads per square inch of 0.001 inch thick dielectric were obtained repeatedly in all instances with dissipation factors between 1 and 2 percent. The dielectric constant of the glass calculated from these capacitors was 270.

The metalizing compositions of this invention contain an inert vehicle, a noble metal powder and binder components in finely divided form. These compositions will generally contain 90 to 50 percent by weight noble metal powder, e.g., silver, gold, palladium, platinum, rhodium, osmium or iridium or mixtures or alloys of two or more of such metals and 50 to 10 percent by weight of the binder, the vitreous compositions of this invention. These percentages are based on the combined weights of noble metal and binder present.

Noble metal powders having a particle size not exceeding 40 microns in diameter are generally usable and those of particle sizes ranging from 0.05 to 10 microns are preferred. Binder particles of a particle size not exceeding 50 microns in diameter are generally usable but those of 1 to 15 microns are distinctly preferred.

Metalizing compositions were prepared using a number of the above glass compositions, applied to alumina substrates, fired and tested for adhesion thereto. Table II, herebelow, sets forth the identity of the noble metal powders and glass compositions which were used in forming the metalizing compositions. The metal powders consisted essentially of particles having sizes within the range of 0.05 to 10 microns. The glass compositions were fritted in water and then ground to particle sizes of about 1 to 15 microns. The metalizing compositions were stenciled through a 200 mesh screen onto the alumina substrates, dried and fired for 2 minutes at temperatures 100° C. above the softening point of the glass composition constituent of the metalizing composition which values are reported in Table I. Adhesion was determined by soldering a 0.025″ tinned copper lead over approximately 0.10 inch of its length to the metalizing composition and pulling off the lead with an Instron tester in "peel." The values of adhesion reported in Table II reflect the adhesive pull in pounds per square inch which was withstood by the metalizing composition-substrate bond.

TABLE II.—METALLIZING COMPOSITIONS, WT. PERCENT

| | Examples | | | | | | | | | | | |
|---|---|---|---|---|---|---|---|---|---|---|---|---|
| | 34 | 35 | 36 | 37 | 38 | 39 | 40 | 41 | 42 | 43 | 44 | 45 |
| Gold powder | 59.83 | 65.25 | 65.25 | 59.83 | 57.12 | 60.17 | 63.75 | | | | | |
| Platinum powder | 8.92 | 9.75 | 9.75 | 8.92 | 8.50 | | | | | | | |
| Palladium powder | | | | | | 10.66 | 11.25 | 70.83 | 73.33 | 13.33 | 11.67 | 14.16 |
| Silver powder | | | | | | | | | | 53.33 | 46.66 | 56.67 |
| Glass binder (Table I) | No. 4 | No. 10 | No. 11 | No. 11 | No. 11 | No. 4 | No. 14 | No. 3 | No. 11 | No. 9 | No. 13 | No. 15 |
| | 14.58 | 8.33 | 8.33 | 14.58 | 17.71 | 12.50 | 8.33 | 12.50 | 10.00 | 16.67 | 25.00 | 12.50 |
| 8% ethylcellulose in beta terpineol | 16.67 | 16.67 | 16.77 | 16.67 | 16.67 | 16.67 | 16.67 | 16.67 | 16.67 | 16.67 | 16.67 | 16.67 |
| Adhesion, p.s.i. | 1,160 | 1,140 | 820 | 1,120 | 1,075 | 1,410 | 1,500 | 1,490 | 1,610 | 2,100 | 2,200 | 2,050 |

Having described various embodiments of the invention for purposes of illustration rather than limitation, what is claimed is as follows:

I claim:
1. A metallizing composition suitable for use in the manufacture of electrical circuits comprising, by weight, 30–75% of a noble metal powder, 15–40% of a liquid vehicle and 7.5–30% of a glass which consists essentially of 15–75% $Bi_2O_3$, 6–82% PbO, 0–7% of $B_2O_3$ and 0–10% of $SiO_2$, the sum of $SiO_2$ and $B_2O_3$ always being 1–15%, and a metal oxide selected from the group consisting of 1–5% $V_2O_5$ or 1–10% $WO_3$.

2. A metallizing composition suitable for use in the manufacture of electrical circuits comprising, by weight, 90–50% of a noble metal powder and 50–10% of a glass which consists essentially of 15–75% $Bi_2O_3$, 6–82% PbO, 0–7% of $B_2O_3$ and 0–10% of $SiO_2$, the sum of $SiO_2$ and $B_2O_3$ always being 1–15%, and a metal oxide selected from the group consisting of 1–5% $V_2O_5$ or 1–10% $WO_3$, wherein the percentages are based on the combined weight of metal powder and glass present.

3. A metallizing composition suitable for use in the manufacture of electrical circuits comprising 30–75% by weight of a finely divided noble metal powder, 15–40% by weight of a liquid vehicle and 7.5–30% by weight of a glass which consists essentially of 15–75% by weight $Bi_2O_3$, 6–82% by weight PbO, 0–7% by weight $B_2O_3$, 0–10% by weight $SiO_2$, the sum of $SiO_2$ and $B_2O_3$ always being 1–15% by weight, and 1–10% by weight $WO_3$.

4. A metallizing composition suitable for use in the manufacture of electrical circuits comprising 30–75% by weight of a finely divided noble metal powder, 15–40% by weight of a liquid vehicle and 7.5–30% by weight of a glass which consists essentially of 15–75% by weight $Bi_2O_3$, 6–82% by weight PbO, 0–7% by weight $B_2O_3$, 0–10% by weight $SiO_2$, the sum of $SiO_2$ and $B_2O_3$ always being 1–15% by weight and 1–5% by weight $V_2O_5$.

References Cited
UNITED STATES PATENTS

| | | | |
|---|---|---|---|
| 2,385,580 | 9/1945 | Knox | 106—49 |
| 2,713,286 | 7/1955 | Taylor | 106—47 |
| 2,853,393 | 9/1958 | Beck et al. | 106—47 |

JAMES E. POER, Primary Examiner

U.S. Cl. X.R.

106—1, 49, 53, 54